US007570001B2

(12) United States Patent
Noro et al.

(10) Patent No.: US 7,570,001 B2
(45) Date of Patent: Aug. 4, 2009

(54) VEHICULAR OPEN AND CLOSE PANEL SYSTEM

(75) Inventors: Yoshiki Noro, Wako (JP); Kenji Shioiri, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 416 days.

(21) Appl. No.: 11/624,241

(22) Filed: Jan. 18, 2007

(65) Prior Publication Data

US 2007/0169418 A1 Jul. 26, 2007

(30) Foreign Application Priority Data

Jan. 20, 2006 (JP) ............................. 2006-012001

(51) Int. Cl.
*B60J 1/08* (2006.01)
*E05F 15/16* (2006.01)

(52) U.S. Cl. ........................ 318/286; 318/266; 318/469

(58) Field of Classification Search ................. 318/626, 318/256, 264–266, 280, 283, 286, 434, 466–469; 49/26–31, 501–502; 160/1
See application file for complete search history.

(56) References Cited

U.S. PATENT DOCUMENTS

| | | | | |
|---|---|---|---|---|
| 5,404,673 | A * | 4/1995 | Takeda et al. | 49/28 |
| 5,949,207 | A * | 9/1999 | Luebke et al. | 318/446 |
| 6,756,754 | B2 * | 6/2004 | Bent et al. | 318/282 |
| 2005/0012484 | A1 * | 1/2005 | Gifford et al. | 318/466 |

FOREIGN PATENT DOCUMENTS

| | | |
|---|---|---|
| JP | 05-047255 | 2/1993 |

* cited by examiner

*Primary Examiner*—Bentsu Ro
(74) *Attorney, Agent, or Firm*—Rankin, Hill & Clark LLP

(57) ABSTRACT

The vehicular open and close panel system includes a drive means configured to supply power for sliding, and opening and closing a panel to open and close an opening of a vehicle body; a drive mechanism configured to operate the panel by power from the drive means; and a controller configured to control an operation of the panel, wherein the controller includes a pinch detection mode of making the panel perform a pinch elimination operation upon detecting a pinch in a close direction operation, and a complete close mode of prioritizing a close direction operation, depending on a complete close operation of a passenger, and wherein after performing the pinch detection operation by the pinch detection mode, the controller changes the close direction operation to the complete close mode until a predetermined condition is satisfied.

4 Claims, 12 Drawing Sheets

VEHICULAR OPEN AND CLOSE PANEL SYSTEM

BACKGROUND OF THE INVENTION

1. Field of the Invention

The present invention generally relates to a vehicle having an electric open and close panel such as a power window, and in more particular, to an operation in a close direction of the open and close panel of the vehicle.

2. Description of the Related Art

In a power window device where a window is adapted to be electrically opened and closed are performed an operation (operation in an open direction) for opening the window and an operation (operation in a close direction) for closing the window by a switch for opening and closing the window attached to the door. Furthermore, the switch for the power window has two-stage switch positions such as a first stage for a manual operation and a second stage for an auto operation in any operation direction of opening and closing. In the manual operation a window operates until a time when the switch is operated. In the auto operation a window operation continues until the window is completely closed or opened even if the switch operation is stopped after its operation. For example, when performing an auto up operation, it is possible to completely close a window without holding a switch at a close position.

An operation of closing a window has a pinch prevention function as a handling of having pinched something in closing the window. This function has a function (pinch detection function) of: determining that an impediment is pinched in a closing window when a speed of the window is reduced; and then lowering the window after stopping the operation of closing the window.

On the other hand, due to this pinch detection function, if there occurs a door trouble, for example, such as a deformation of a door sash, there can occur a situation that a reverse operation (hereinafter referred to as "error reversal") is performed by the pinch detection function and that the window is not completely closed, notwithstanding nothing having been pinched. If so, there are possibilities that: rain drops inside when such rain falls; and something is stolen when a passenger is away from the vehicle. From such viewpoints is requested a complete close mode of intentionally not using the pinch detection.

As an example of the complete close mode there exists a method of changing a safety free switch to a close state by manual, temporarily nullifying a pinch detection, and completely closing a window panel when the window panel is not properly housed in an uppermost position due to the deformation of a door sash as described above (see Japanese Patent Laid-Open Publication No. H 05-47255 (column 8, last page to column 9, line 14 and FIG. 1).

Furthermore, instead of providing an exclusive switch of the complete close mode, there also exists a method of setting the mode in either a manual position or auto position of a window operation switch.

However, in the method of the Japanese Patent Laid-Open Publication No. H 05-47255, it is necessary to provide the safety free switch other than a normal window operation switch. Furthermore, there also exists a problem that a pinch detection is not performed as far as the safety free switch is operated.

Considering the method of setting the complete close mode in a change position of a window operation switch, when setting the mode in a manual position, although during the manual operation is not performed a pinch detection, the method has a same specification as a conventional manual mode system without the pinch detection. When operating the switch until an auto position, although a window cannot be completely closed in such a door trouble that a door sash is deformed because the pinch detection is always performed, it is possible to completely close the window by the manual operation.

Furthermore, if setting the complete close mode in an auto position, in a conventional manual operation is performed a pinch detection; if operating the switch until the auto position, the pinch detection is stopped. In other words, as far as operating the switch to a position where the complete close mode is performed, because the method surely becomes the mode notwithstanding having the pinch detection, there exists a problem of frequently using the mode of not detecting a pinch more than necessary.

Accordingly, there is a need for an open and close panel system of a vehicle having a pinch detection function that enables a complete close mode to be used as requested without needing special hardware.

SUMMARY OF THE INVENTION

A first aspect of a vehicular open and close panel system of the present invention comprises a drive means configured to supply power for sliding, and opening and closing a panel to open and close an opening of a vehicle body; a drive mechanism configured to operate the panel by power from the drive means; and a controller configured to control an operation of the panel, wherein the controller includes a pinch detection mode of making the panel perform a pinch elimination operation upon detecting a pinch in a close direction operation, and a complete close mode of prioritizing a close direction operation, depending on a complete close operation of a passenger, and wherein after performing the pinch detection operation by the pinch detection mode, the controller changes the close direction operation to the complete close mode until a predetermined condition is satisfied.

In accordance with the vehicular open and close panel system, because after performing the pinch detection operation by the pinch detection mode, the controller changes the close direction operation to the complete close mode until a predetermined condition is satisfied, if a passenger instructs a close operation (the passenger being determined to have an intention of completely closing the panel) after the pinch detection operation, it is possible to completely close the open and close panel without failure.

A second aspect of a vehicular open and close panel system of the present invention is characterized in that the controller performs a pinch detection operation by the pinch detection mode, then changes the close direction operation to the complete close mode until completely closing the panel, and then after completely closing the panel, again changes the complete close mode to the pinch detection mode.

In accordance with this configuration, because after completely closing the panel, the controller again changes the complete close mode to the pinch detection mode, it is possible to properly perform a pinch detection by making the pinch detection effective except for a time when a complete close operation of the panel is requested.

A third aspect of a vehicular open and close panel system of the present invention is characterized in that the controller performs a pinch detection operation by the pinch detection mode, then changes the close direction operation to the complete close mode until a predetermined time elapses, and then after the predetermined time elapsing, again changes the complete close mode to the pinch detection mode.

In accordance with this configuration, because after a predetermined time (for example, one to two minutes) elapsing, the controller again changes the complete close mode to the pinch detection mode, it is possible to properly perform a pinch detection by making the pinch detection effective except for a time when a complete close operation of the panel is requested.

A fourth aspect of a vehicular open and close panel system of the present invention is characterized in that the controller performs a pinch detection operation by the pinch detection mode, then changes the close direction operation to the complete close mode until an ignition switch of a vehicle is made OFF, and then after the ignition switch of the vehicle being made OFF, again changes the complete close mode to the pinch detection mode.

In accordance with this configuration, because after an ignition switch of a vehicle being made OFF and again made ON, the controller again changes the complete close mode to the pinch detection mode, it is possible to properly perform a pinch detection by making the pinch detection effective except for a time when a complete close operation of the panel is requested.

BRIEF DESCRIPTION OF THE DRAWINGS

FIG. 4A is a flowchart of a main program for performing a pinch detection; FIG. 4B is a subroutine for performing an operation of eliminating a pinch state in a case of performing the pinch detection and detecting a pinch; FIG. 4C is a flowchart of an interruption subroutine performed according to a timer interruption; and FIG. 4D is a flowchart showing a flow of a close direction operation after a pinch detection according to a first embodiment of the present invention.

FIG. 6A, a case of a switch being at a manual close position; and FIG. 6B, a case of the switch being at an auto close position.

BEST MODE FOR CARRYING OUT THE INVENTION

Here will be described the present invention in detail according to embodiments of the invention and attached drawings. In addition, a same reference symbol will appended to a same element in a case of indicating it in a plurality of drawings.

Figure 1:
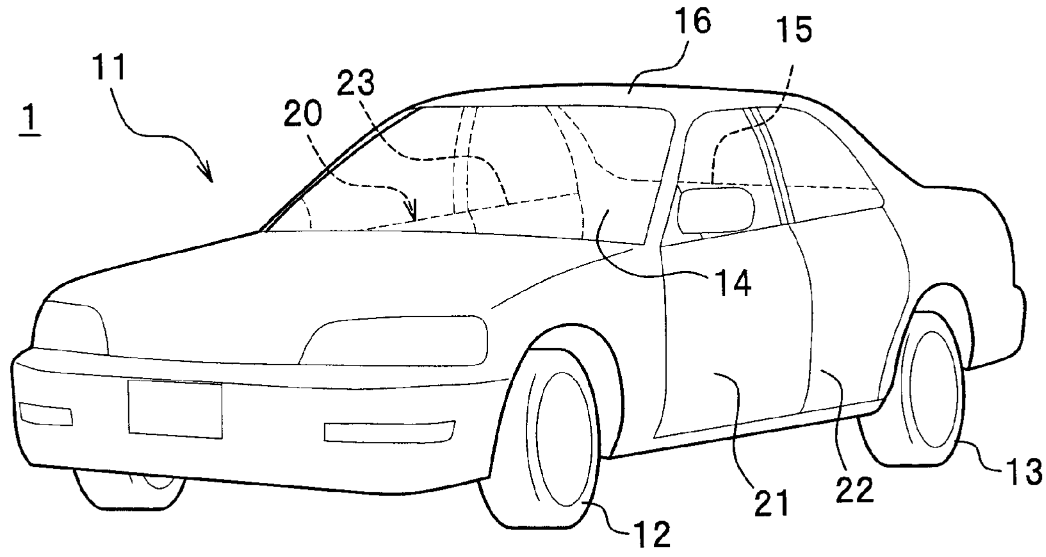
FIG. 1 is a perspective view showing an appearance of a vehicle having a power window system according to an embodiment of the present invention.

FIG. 1 is a perspective view showing an appearance of a vehicle having a power window system (in detail described later) according to an embodiment of the present invention. In FIG. 1 a vehicle 1 comprises a vehicle body 11, front wheels 12, rear wheels 13, a front widow 14, a rear window 15, a roof 16, and a front right door 20, a front left door 21, a rear left door 22, and a rear right door 23 having a power window system according to an embodiment of the present invention. Because a Japanese car normally has a driver's seat at a front right, a description will be made, taking the front right door 20 at a driver's seat side as an example. In addition, in a description below, when elements included in respective doors of the front right door 20, the front left door 21, the rear right door 23, and the rear left door 22 are distinguished as front right, front left, rear right, and rear left, they are distinguished by respectively appending FR, FL, RR, and RL before themselves.

Figure 2:
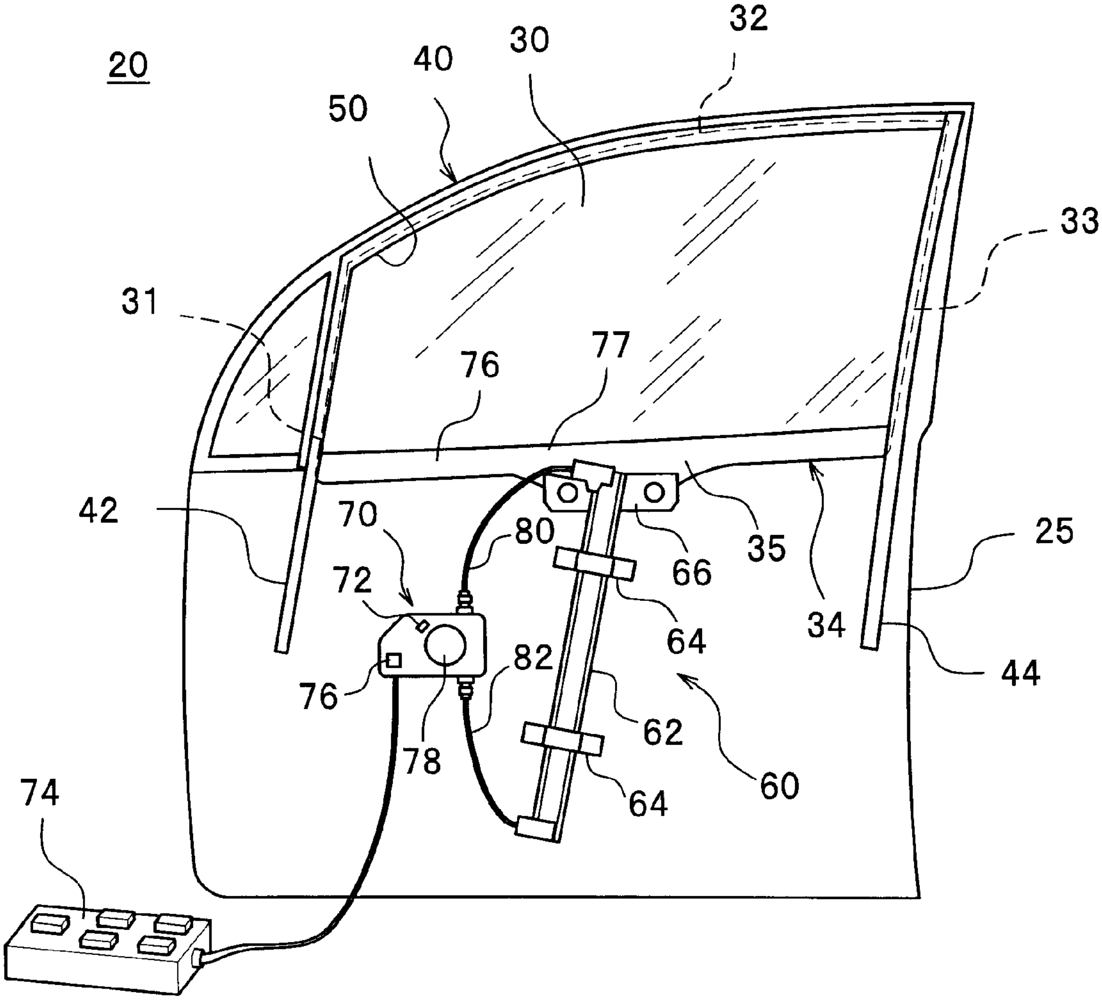
FIG. 2 is a side view of a door at a driver's seat side in FIG. 1 seen from inside, removing a lining.

FIG. 2 is a side view of the front right door 20 at a driver's seat side in FIG. 1 seen from inside, removing a lining. In FIG. 2 the front right door 20 comprises a door main body 25; a door glass 30; sashes 40, 42, and 44 of a window frame; a run channel 50 lined to the sashes 40, 42, and 44 and in contact with a hem of the door glass (panel) 30; a regulator 60 configured to open and close the door glass 30; a drive unit 70 configured to control and drive the regulator 60; and a main switch unit 74 configured to operate a power window. The door glass 30 comprises a front edge 31, an upper edge 32, a rear edge 33, and a lower edge 34, and at the lower edge 34 is formed an attachment portion 35 configured to be attached to the regulator 60. Although the main switch unit 74 is depicted as away from the door main body 25 for convenience of the depiction, it is actually attached to a position of the body 25 to be easily operated.

The regulator 60 comprises a rail 62, brackets 64 configured to fix the rail 62 at a door lower portion of the door main body 25, and a slide portion 66 configured to be slidably attached to the rail 62. The drive unit 70 comprises a motor 78 of a drive source of the door glass 30; a position sensor 72 configured to detect a position of the door glass 30, based on a signal from a motor driving circuit not shown; and a power window (PW) main control unit 76 configured to control a rotation of the motor 78, based on signals from the position sensor 72 and the main switch unit 74. In addition, the PW main control unit 76 may also be arranged not inside the drive unit 70, but inside the switch unit 74.

Figure 3A:
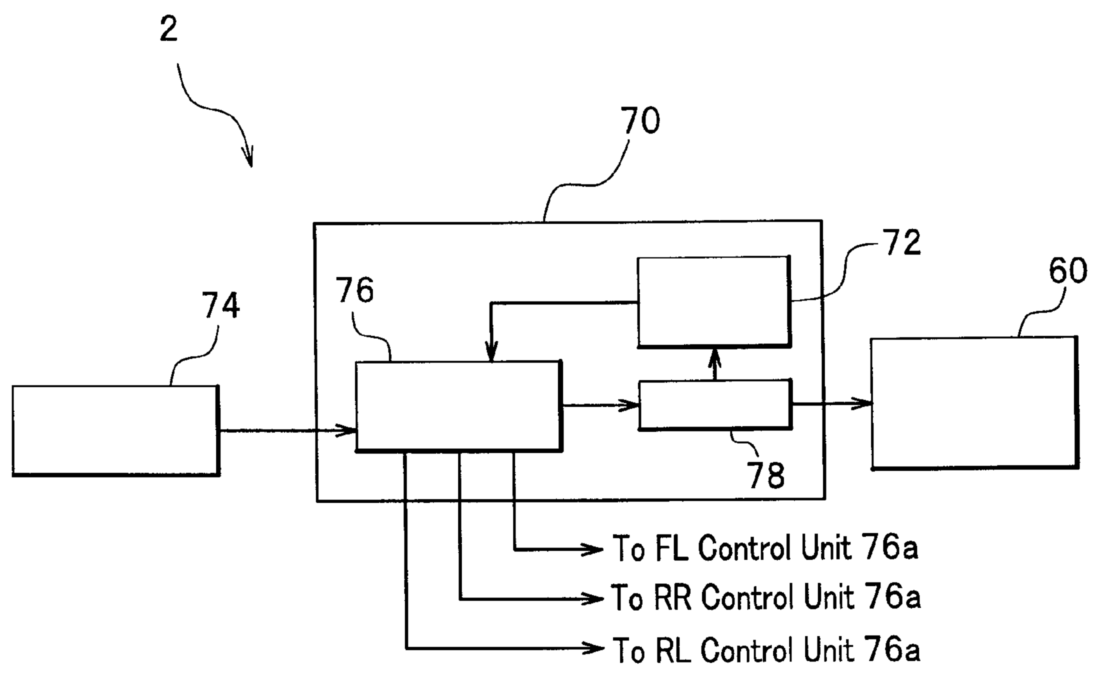
FIG. 3A is a block diagram conceptually showing a configuration of a power window system with which a driver's side door is equipped according to an embodiment of the present invention.

The main switch unit 74, drive unit 70, FR door regulator 60, and FR window glass (FRW panel) 30 driven by the regulator 60 configure, as shown in FIG. 3A, a FR power window system 2 equipped at the door 20 of a driver's seat side according to an embodiment of the present invention. In FIG. 3A FR means front right. The position sensor 72 of the drive unit 70 is a known sensor for detecting a rotational state of the motor 78 as a pulse, counts a number of pulses per unit time, and hands them to the PW main control unit 76.

The PW main control unit 76 is a well known microcomputer including such a CPU (Central Processing Unit), a ROM (Read Only Memory), and a RAM (Random Access Memory) not shown. The PW main control unit 76, as needed, uses the pulses received from the position sensor 72, respectively calculates a rotation speed of the motor 78 based on a pulse frequency and a current position of the door glass 30 based on the pulse number, and memorizes them. Furthermore, in the embodiment, calculating a rotation speed, the PW main control unit 76 makes it a current value and reads a previous rotation speed memorized in the memory as a previous value, compares the current value with the previous value (the current value-the previous value), and thus calculates a rotational variation quantity of the motor 78. Comparing the rotational variation quantity with a pinch determination threshold memorized in advance, when the rotational variation quantity is not less than the pinch determination threshold, the PW main control unit 76 determines that a foreign matter is pinched between the door glass 30 and the window frame.

The main switch unit 74 of the front right door 20 comprises not only switches for opening and closing the door glass 30 of the door 20 and individual switches for opening and closing those of the doors 21, 22, and 23, but also a switch for simultaneously opening and closing those of all the doors 20 to 23. Furthermore, accordingly, the PW main control unit 76 of the front right door 20 is connected so as to be able to respectively send control signals to PW main control units 76*a* of the other windows 21 to 23.

Figure 3B:
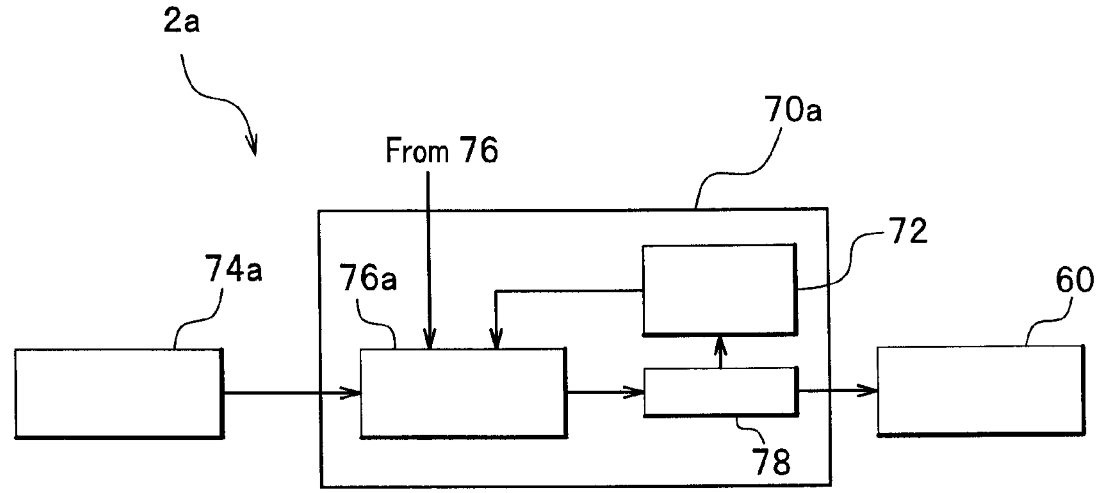
FIG. 3B is a block diagram conceptually showing a configuration of a power window system, with which doors other than a driver's side door is equipped, according to an embodiment of the present invention.

FIG. 3B is a block diagram conceptually showing a configuration of a power window system, with which each of the doors 21 to 23 other than the door 20 at a driver's side is equipped, according to an embodiment of the present invention. Each power window system 2*a* of the doors 21 to 23 is same as the FR power window system 2 except that the PW main control unit 76 and the drive unit 70 are replaced with the respective PW control units 76*a* and respective drive units 70*a*. Each switch unit 74*a* of the doors 21 to 23 comprises only one switch configured to open and close each door glass 30. Furthermore, each PW main control unit 76*a* of the doors 21 to 23 operates, depending on not only a control signal from the switch unit 74*a* but also a control signal (see FIG. 3A) from the PW main control unit 76 of the door 20 at the driver's seat side. In addition, the regulator 60 dose not differ in the doors 20 to 23.

Excluding the above mentioned matters, because there exists no difference between the FR power window system 2 of the door 20 and other FL, RR, and RL power window systems 2*a*, a description will be made, taking the system 2 of the door 20 as an example; a content thereof is also applied to the system 2*a*. In addition, as mentioned above, although there exist five switches in the main switch unit 74, in order to equally handle it with the switch unit 74*a* of the doors 21-23 in a description below, a switch for operating the door glass 30 of the door 20 is called "switch 24" for convenience.

In a not shown volatile memory (for example, such a ROM) of the PW main control unit 76 is stored a power window control program configured to realize a power window control operation according to an embodiment of the present invention by a not shown CPU executing the program. Although the power window control program is not shown, a structure thereof will be conceptually described according to a flowchart. The power window control program has a pinch detection processing function of detecting a pinch occurrence and reversely operating the door glass 30 in the occurrence; an operation mode with a pinch detection or an operation function with the pinch detection of opening and closing the glass 30 while performing the pinch detection, based on an instruction of a passenger; and a complete close mode or complete close function of performing a close direction operation without performing the pinch detection after the detection.

First Embodiment

Figure 4A:
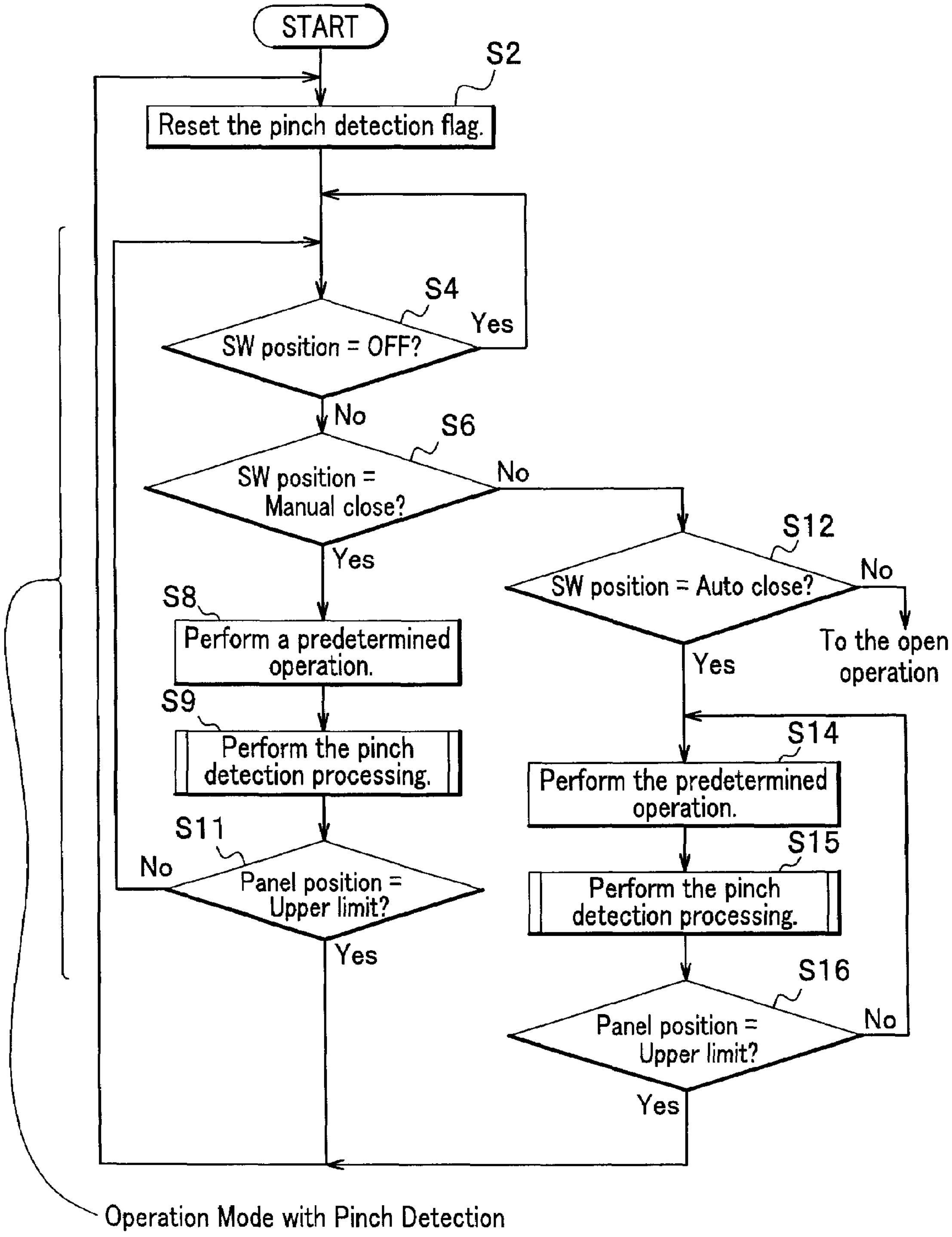
FIGS. 4A to 4D are flowcharts showing an operation flow of a window control program of a power window system according to an embodiment of the present invention.
Figure 4B:
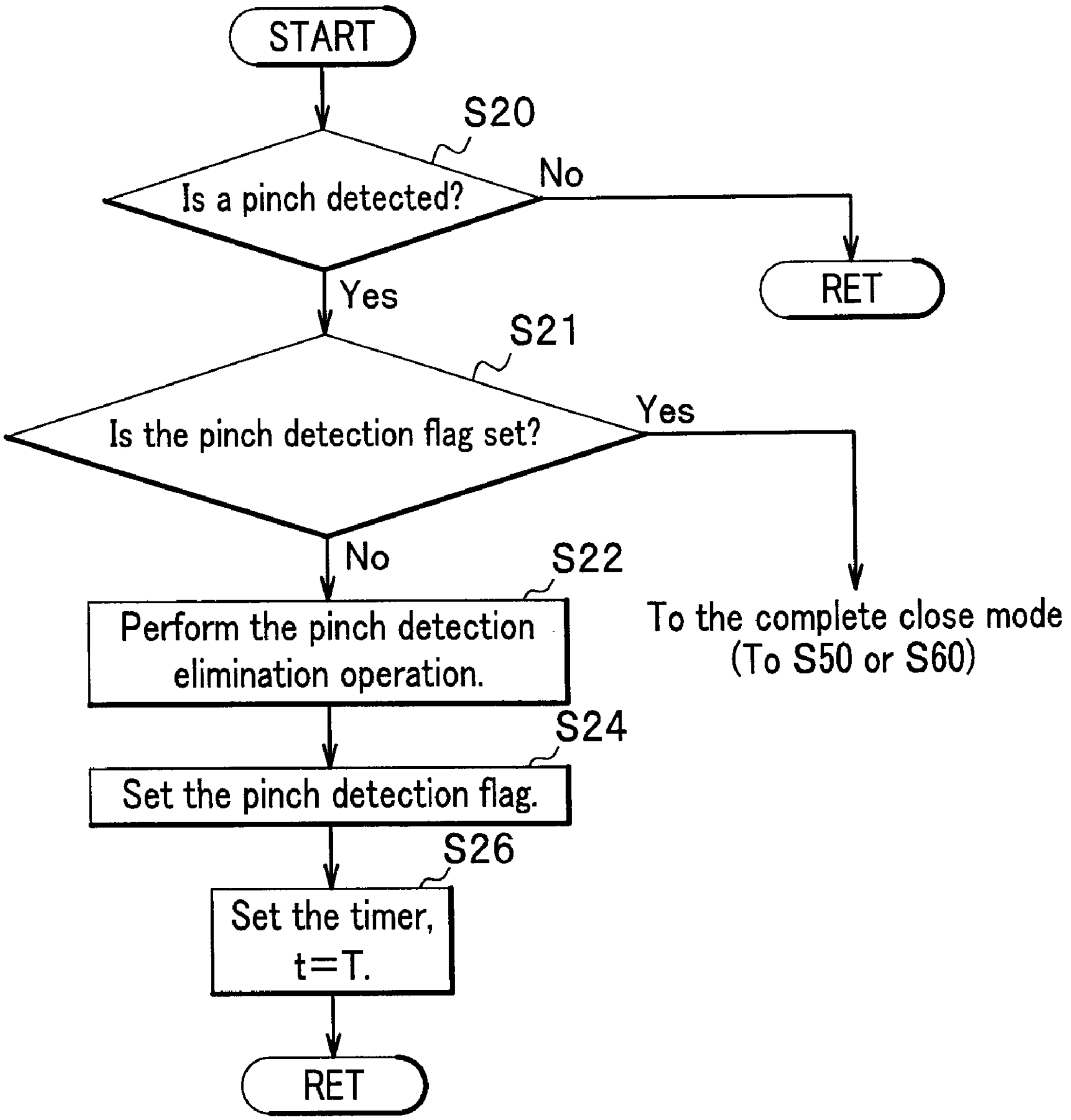
Figure 4C:
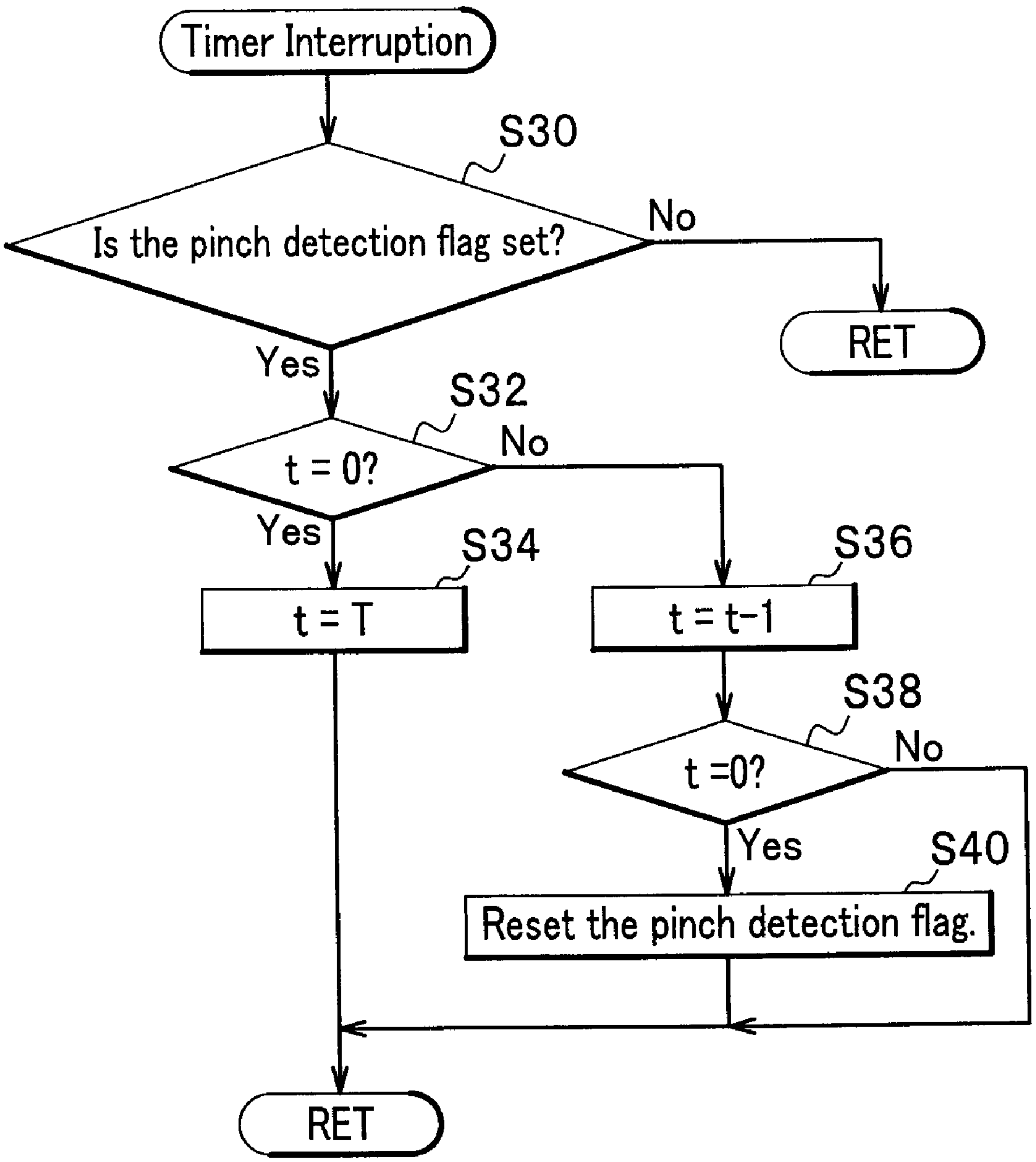
Figure 4D:
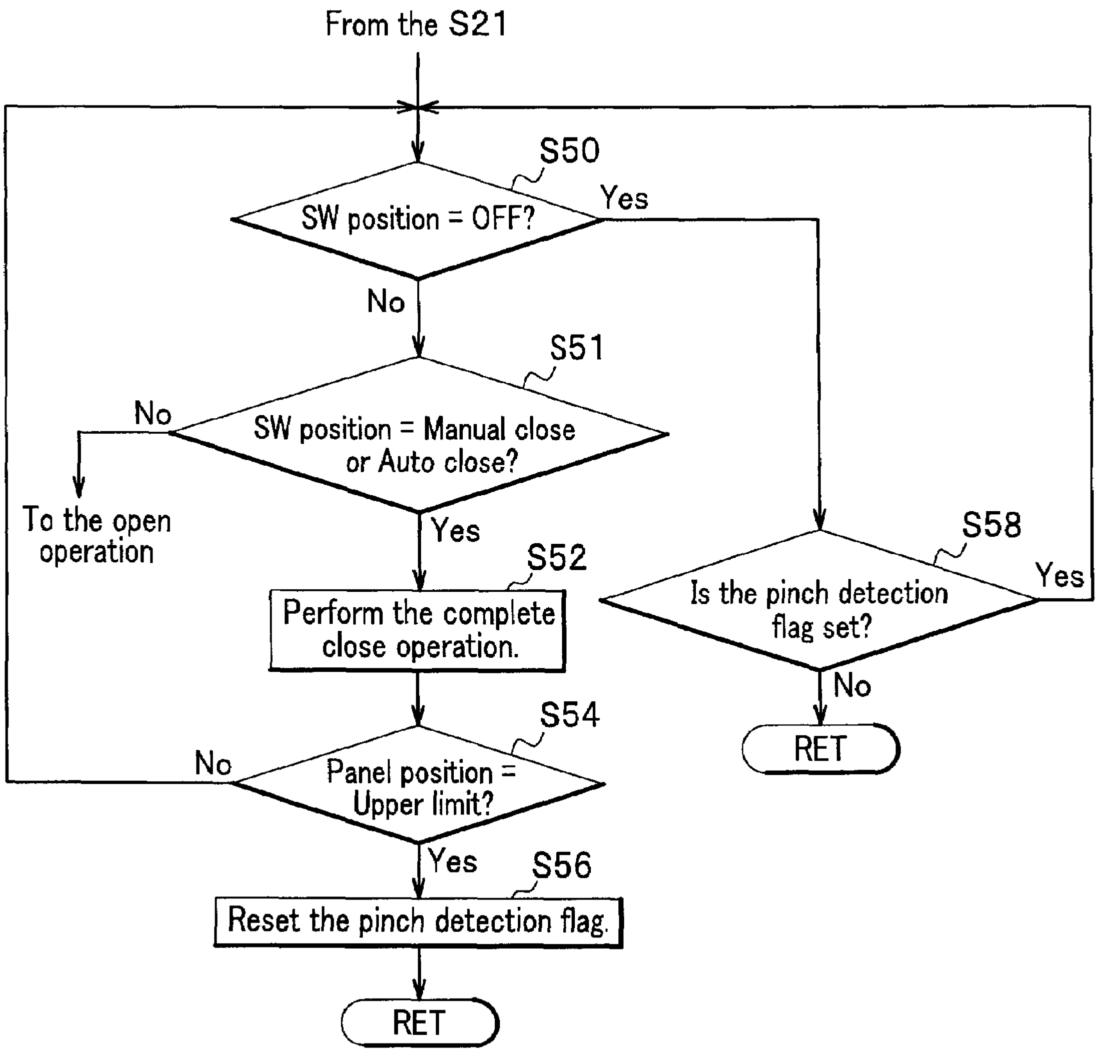

FIGS. 4A to 4D are flowcharts showing an operation flow of a window control program of a power window system according to an embodiment of the present invention; FIG. 4A is a flowchart of a main program for performing a pinch detection, which the program is called and performed when a power source is switched ON by an ignition switch not shown; FIG. 4B is a subroutine for performing an operation of eliminating a pinch state in a case of performing the pinch detection and detecting a pinch; FIG. 4C is a flowchart of an interruption subroutine performed according to a timer interruption; and FIG. 4D is a flowchart showing a flow of a close direction operation after a pinch detection according to a first embodiment of the present invention.

In FIG. 4A the PW main control unit 76 (actually, a not shown CPU of the unit 76; so hereinafter simply referred to as CPU) firstly in a step S2 resets (corresponds to a state of a pinch being not detected) a pinch detection flag for indicating whether or not the pinch is detected; in a determination step S4, waits while a position (hereinafter simply referred to as "switch position") of the switch 74 for operating the door glass 30 of the door 20 is OFF; and in a case of the switch position being not OFF, determines in a determination step S6 whether or not the switch position is at a manual close position. If the switch position is the manual close position, the PW main control unit 76 performs in a step S8 a predetermined close operation (that is, an operation of moving the window panel 30 by a predetermined minute distance in a close direction), and in a step S9, performs the pinch detection processing shown in FIG. 4B. In other words, in a determination step S20 of FIG. 4B the PW main control unit 76 determines whether or not a pinch is detected, and if not detected, the processing returns to a main routine. Returning to FIG. 4A, the PW main control unit 76 determines whether or not a position (because the present invention is applicable to panel control for opening and closing an opening provided in, for example, such a roof of the vehicle body 11, the position of the door glass 30 is simply referred to as "panel position") of the door glass 30 has reached an upper limit, that is, whether or not the panel 30 is completely closed. In a determination step S11, if the panel position has not reached the upper limit (in a case of No), the processing returns to the step S4. In the determination step S11, if the panel position is equal to the upper limit, it means that the door 20 is completely closed; therefore, the processing returns to the step S2.

On the other hand, in the determination step S20 of FIG. 4B, if the pinch is detected (in a case of Yes), the PW main control unit 76 determines in a further determination step S21 whether or not the pinch detection flag is in a set state. If the pinch detection flag is not in the set state (in a case of No), the PW main control unit 76 performs in a step S22 a pinch elimination operation. Although it can be thought, for example, as the pinch elimination operation, to immediately stop a close operation and to perform a reverse operation, anything is available not limited thereto if an operation is proper. Following the pinch elimination operation in the step S22, in a step S24 the PW main control unit 76 sets the pinch detection flag and records having performed the pinch detection processing. Moreover, in a step S26 the PW main control unit 76 sets a timer variable a predetermined time T in order to measure an elapse time from the pinch detection processing, and the processing returns to the main routine. In addition, in detail will be later described a complete close mode in a case of the pinch detection flag having been set (in a case of Yes, the complete close mode) in the determination step S21.

Thus, according to the steps S6 to S11 is performed the manual close operation of the pinch detection mode.

On the other hand, in the determination step S6 of FIG. 4A, if the switch position is not the manual close position (in a case of No), in a further step S12 the PW main control unit 76 determines whether or not the switch position is an auto close position. If the switch position is the auto close position (in a case of Yes), the PW main control unit 76 performs the predetermined close operation in a step S14, performs in a step S15 the pinch detection processing described with reference to FIG. 4B, and then, determines in a determination step S16 whether or not the panel position is at the upper limit. If the panel position is not at the upper limit, that is, the panel is not completely closed (in a case of No), the processing returns to the step S14. If the panel position is at the upper limit, the door glass 30 is determined to be completely closed; therefore, the processing returns to the step S4 of a waiting state of a switch operation. In addition, in a case of No in the determination step S12, although unit 76 performs an open direction operation, the operation is performed according to a conventional method, and the case is not relevant to the present invention; therefore, a description thereof will be omitted.

Thus, according to the steps S14 to S16 is performed the auto close operation of the pinch detection mode.

Next will be described a close direction operation after a pinch detection according to an embodiment of the present invention, referring to FIG. 4D (FIG. 4C will be described later). In the determination step S21 of the pinch detection processing of FIG. 4B, if the step S21 has indicated a state of the pinch detection flag being set, the pinch detection processing being performed, and then a predetermined condition described later being not satisfied yet (in a case of No), the PW main control unit 76 determines in a determination step S50 of FIG. 4D whether or not the switch position is OFF. If the switch position is OFF, the PW main control unit 76 determines in a determination step S58 whether or not a pinch detection flag is set. If the pinch detection flag is set (in a case of Yes), a predetermined condition is not definitely satisfied after the pinch detection processing is performed; therefore, because it is requested to perform a complete close operation in a case of a passenger requesting a close operation, the processing returns to the determination step S50. In the determination step S58, if the pinch detection flag is not set, it means that after the pinch detection processing is performed, a predetermined condition is not satisfied; therefore, the processing returns to the main routine without performing anything.

In the determination step S50, if the switch position is not OFF, the PW main control unit 76 determines in a determination step S51 whether or not the switch position is one of the manual close position and the auto close position. In the determination step S51, if the switch position is one of the manual close position and the auto close position (in a case of Yes), the PW main control unit 76 performs a predetermined close operation in a step S52 and determines in a step S54 whether or not the panel position is at the upper limit. If the panel position is not at the upper limit, the processing returns to the step S50. In the determination step S54, if the determination is Yes, it means that the door glass 30 is completely closed; therefore, in a step S56 the PW main control unit 76 resets the pinch detection flag, and the processing returns to the main routine. On the other hand, in the determination step S51, if the switch position is not any one of the manual close position and the auto close position, the PW main control unit 76 definitely performs an open operation; however, from the above mentioned reason will be omitted a description of the open operation.

Thus, according to the steps S50 to S54 is performed the complete close operation (that is, the complete close operation is performed while the switch position is maintained at any one of the manual close position and the auto close position) even if the any one is selected, as far as a predetermined condition is not satisfied after the pinch detection processing is performed.

Figure 5:
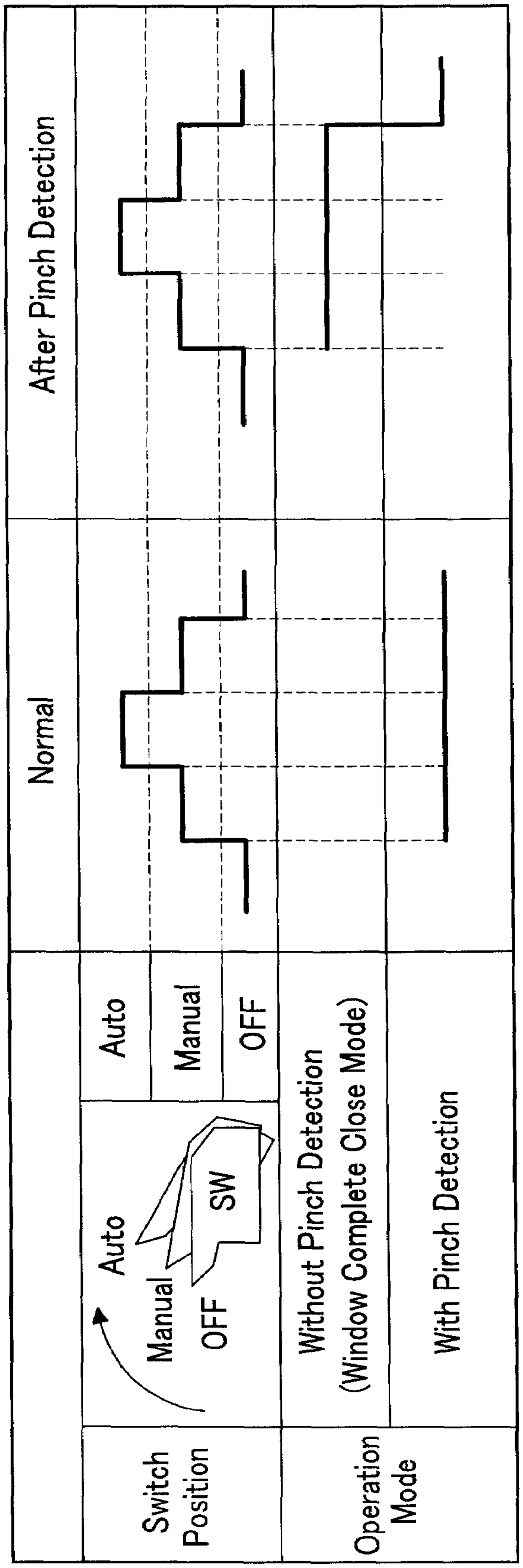
FIG. 5 is a diagram illustrating a close direction operation after the pinch detection according to the first embodiment.

A manner of the operation of the first embodiment thus described is shown in FIG. 5. FIG. 5 is a diagram illustrating a close direction operation after the pinch detection according to the first embodiment in a case of the window operation switch being again operated in the close direction. In other words, in a normal case of a pinch being not detected, any one of the manual close operation and the auto close operation is performed with the pinch detection mode. However, until a time when a predetermined condition is satisfied (as far as the pinch detection flag is set) after the pinch detection processing is once performed, the PW main control unit 76 detects any one of the manual close position and auto close position of the switch 74 and performs the complete close operation described above, while a passenger is operating the switch 74 in the close operation direction.

In addition, as the predetermined condition for resetting the set pinch detection flag are cited the following cases: firstly, the case of Yes in the determination step S54 of FIG. 4D, that is, the panel position being at the upper limit; secondly, once switching off the ignition switch (not shown) and again switching it ON because of the pinch detection flag having been reset in the step S2 of FIG. 4A; and in addition, measuring an elapse time with a timer after a pinch detection processing being performed, and then resetting the pinch detection flag after an elapse of the predetermined time T.

A timer interruption processing will be described, referring to FIG. 4C. A program of the timer interruption processing is to start measuring a time just after a pinch detection flag is set, resetting the flag after the elapse of the predetermined time T, and to finish the time measuring operation. In FIG. 4C, firstly in a determination step S30 the PW main control unit 76 determines whether or not a pinch detection flag is set. If the pinch detection flag is not set, the processing returns to the main routine without performing anything. In the determination step S30, if the pinch detection flag is set (in a case of Yes), in a further determination step S32 the PW main control unit 76 determines whether or not the timer variable t is zero (that is, whether or not measuring a time is already started). If t=0 (in a case of Yes), the PW main control unit 76 sets the timer variable t to be the predetermined time T and the processing returns to the main routine because measuring the time is not started (that is, a first timer interruption after the pinch detection processing).

In the determination step S32, if t≠0 (in a case of No), the PW main control unit 76 decrements the timer variable t in a step S36 and determines in a step S38 whether or not t=0. If t≠0 (in the case of No), the processing returns to the main routine to further measure the time; if t=0 (in the case of Yes), the PW main control unit 76 resets the pinch detection flag in a step S40, and the processing returns to the main routine because the predetermined time T definitely has elapsed.

Thus by using a timer, it is possible to limit a period, when a complete close operation after a pinch detection processing is performed, to nothing but the predetermined time T. Accordingly, by properly setting the predetermined time T, in a case of a pinch detection processing is once performed, it is possible to evade a state of a close operation being performed with the complete close mode even under a situation where the close mode has become not to be requested.

Of course, as a modification of the embodiment, a mode of not using a timer can be considered. In this case, as shown in FIG. 4C, because the pinch detection flag is not reset by a timer, the close operation is definitely performed with the complete close mode after the pinch detection processing, as far as the panel position is not at the upper limit or the ignition switch is not once switched off.

Second Embodiment

Figure 6A:
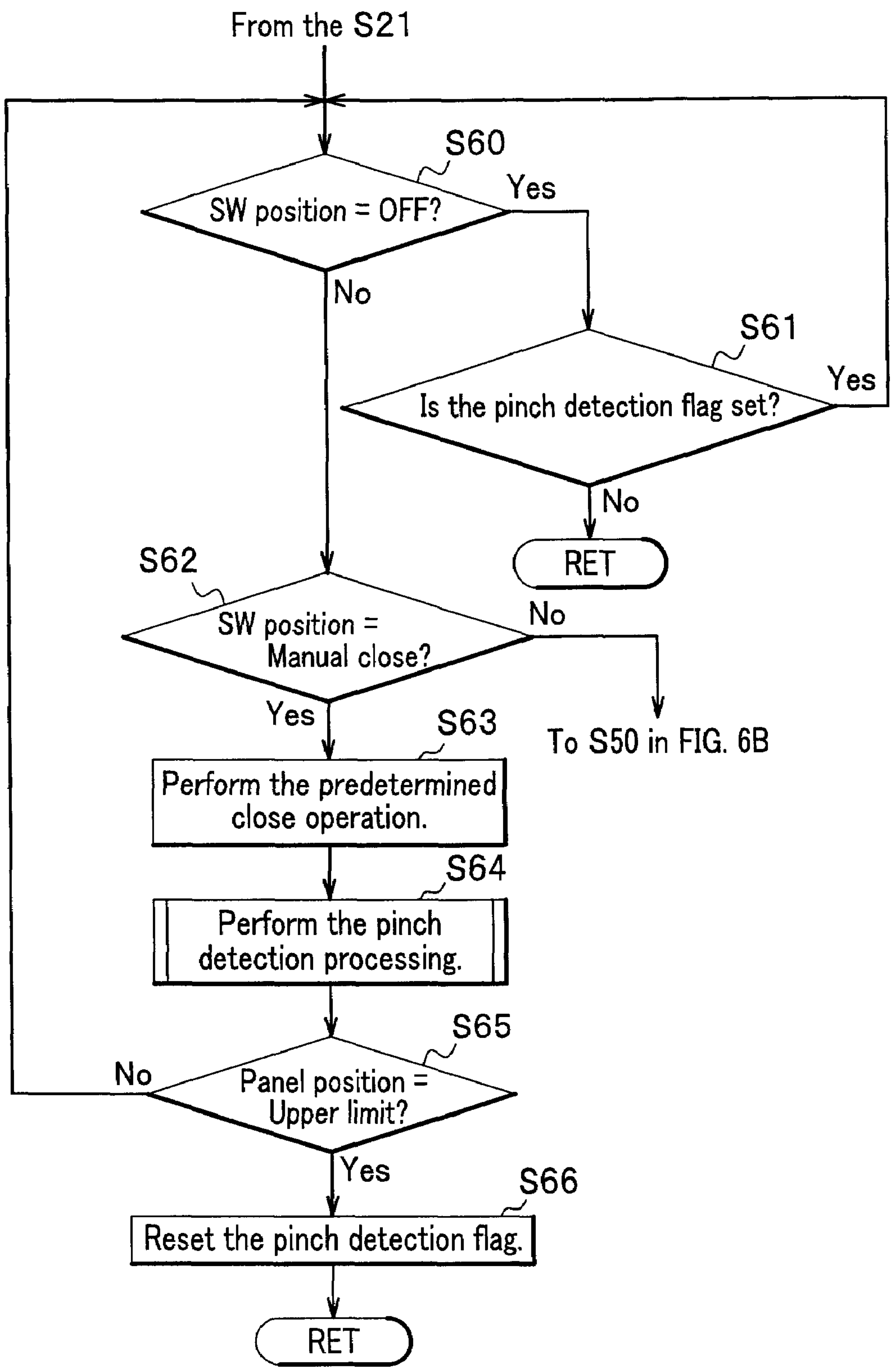
FIGS. 6A and 6B are flowcharts showing a flow of a close direction operation after a pinch detection according to a second embodiment of the present invention.
Figure 6B:
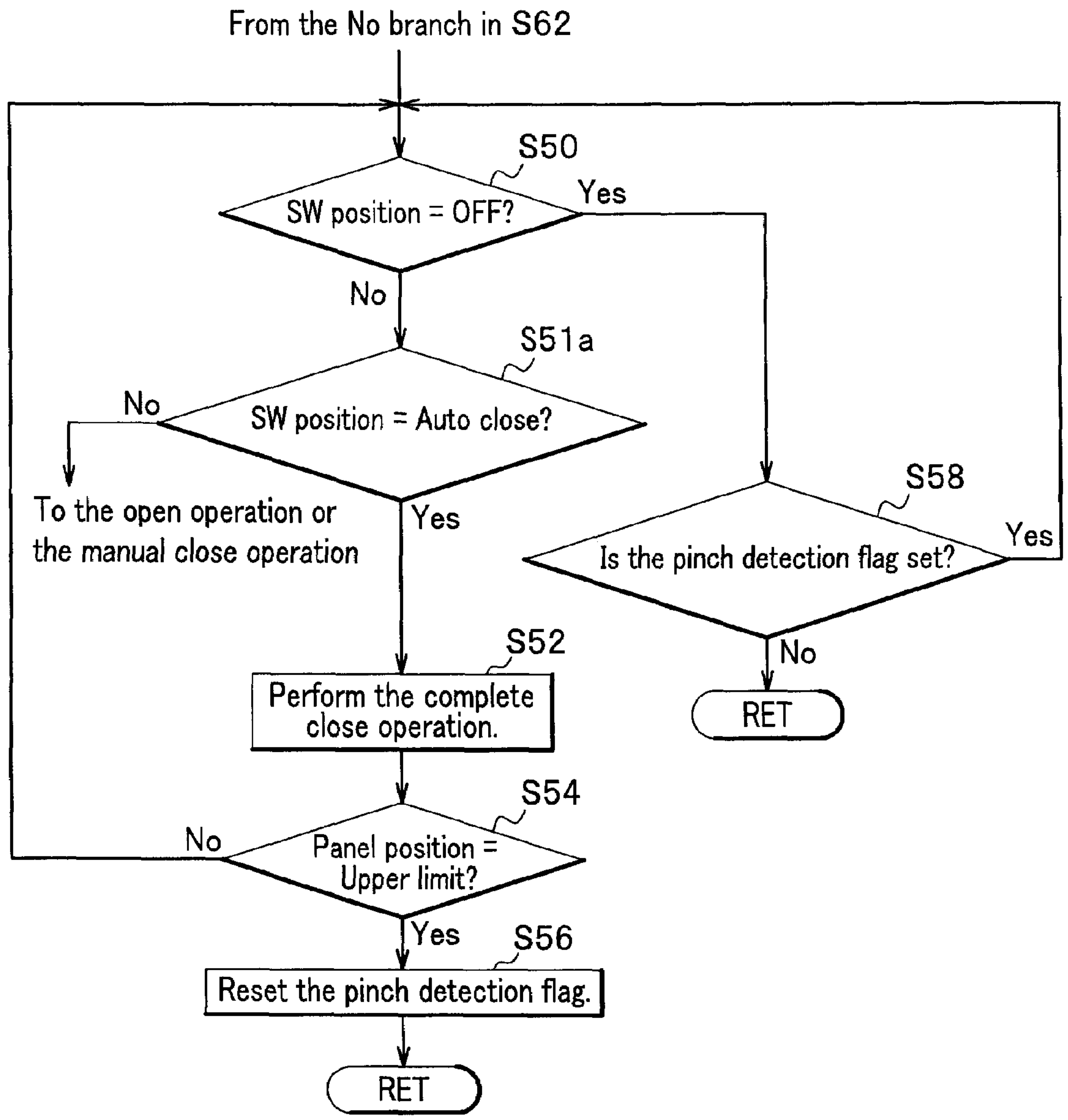

FIGS. 6A and 6B are flowcharts showing a flow of a close direction operation after a pinch detection according to a second embodiment of the present invention. In a determination step S21, if the determination is No, the PW main control unit 76 determines in a step S60 of FIG. 6A whether or not the switch position is OFF. If the switch position is OFF, the PW main control unit 76 determines in a step S61 whether or not the pinch detection flag is set. If the pinch detection flag is not set (in a case of No), the processing returns to the main routine without performing anything; if the flag is set (in a case of Yes), the processing returns to the step S60.

In the step S60, if the switch position is not OFF, the PW main control unit 76 determines in a determination step S62 whether or not the switch position is the manual close position. If the switch position is the manual close position (in a case of Yes), the PW main control unit 76 performs a predetermined close operation in a step S63, performs the pinch detection processing of FIG. 4B in a step S64, and determines in a determination step S65 whether or not the panel position is at the upper limit. If the panel position is at the upper limit (in a case of Yes), the PW main control unit 76 resets the pinch detection flag in a step S66, and the processing returns to the main routine. In the determination step S65, if the panel position is not at the upper limit (in a case of No), the processing returns to the determination step S 60. In other words, in the determination step S62 the PW main control unit 76 continues the predetermined manual close operation according to the steps S60 to 65 as far as the switch position is set at the manual close position.

Figure 7:
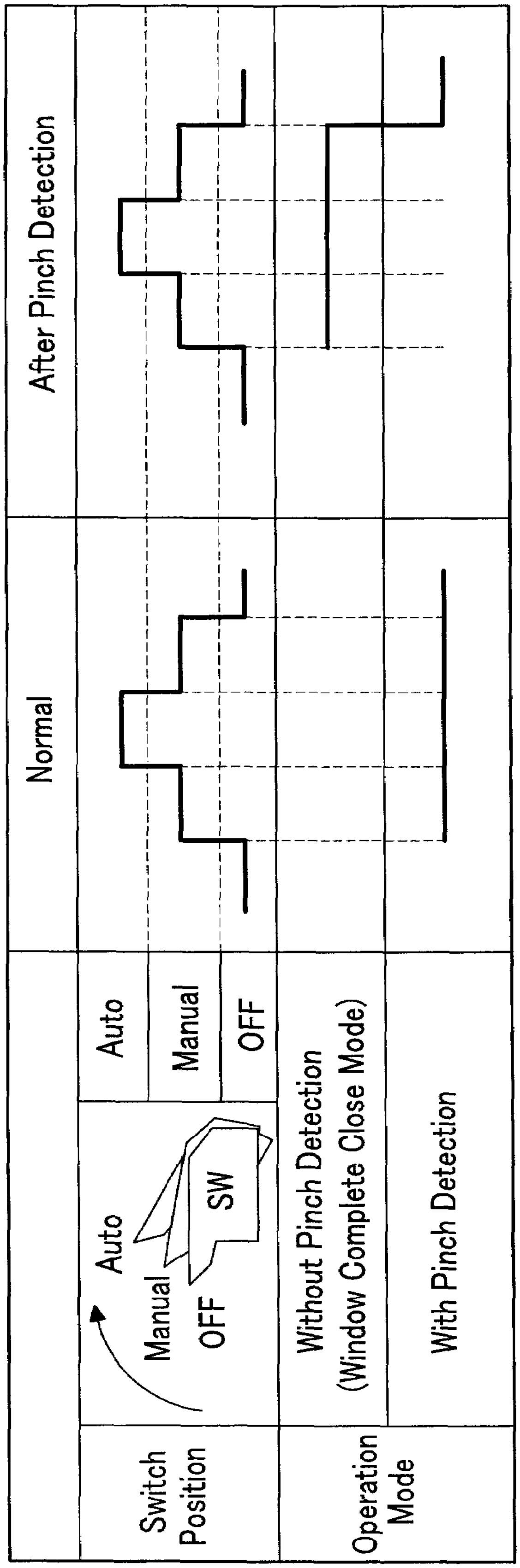
FIG. 7 is a diagram illustrating the close direction operation after the pinch detection according to the second embodiment.

In the determination step S62, if the switch position is not the manual close position, the processing proceeds to the step S50 of FIG. 6B. The flowchart of FIG. 6B is same as that of FIG. 4D except that the step S51 is replaced with the step S51*a*. In the determination step S51*a* of FIG. 6B, because the PW main control unit 76 determines whether or not the switch position is the auto close position, the unit 76 performs the complete close operation until the predetermined condition is satisfied as far as the switch position is maintained at the auto close position. If the switch position is not the auto close position (in a case of No), the unit 76 definitely performs one of the open operation and the manual close operation. A description of the open operation will be omitted. In a case of the manual close operation, the processing proceeds to the step S63 of FIG. 6A and definitely performs the manual close operation of performing the pinch detection. FIG. 7 is a diagram illustrating the close direction operation after the pinch detection according to the second embodiment. As proved from the description of FIG. 6, and FIG. 7, in accordance with the second embodiment, in the case of performing the pinch detection, the PW main control unit 76 performs the pinch detection in the manual close operation; in the case of the switch position being the auto close position, the unit 76 performs the manual complete close operation. In other words, the PW main control unit 76 performs the complete close operation only while a passenger maintains the window open and close switch to be at the auto close position.

In addition, in a case of the switch position being the auto close position is also enabled a mode of performing steps S71 to S76 (auto close operation of the pinch detection mode) of FIG. 8 as described later, instead of performing the manual close operation of the complete close mode as in FIG. 6B.

Third Embodiment

Figure 8:
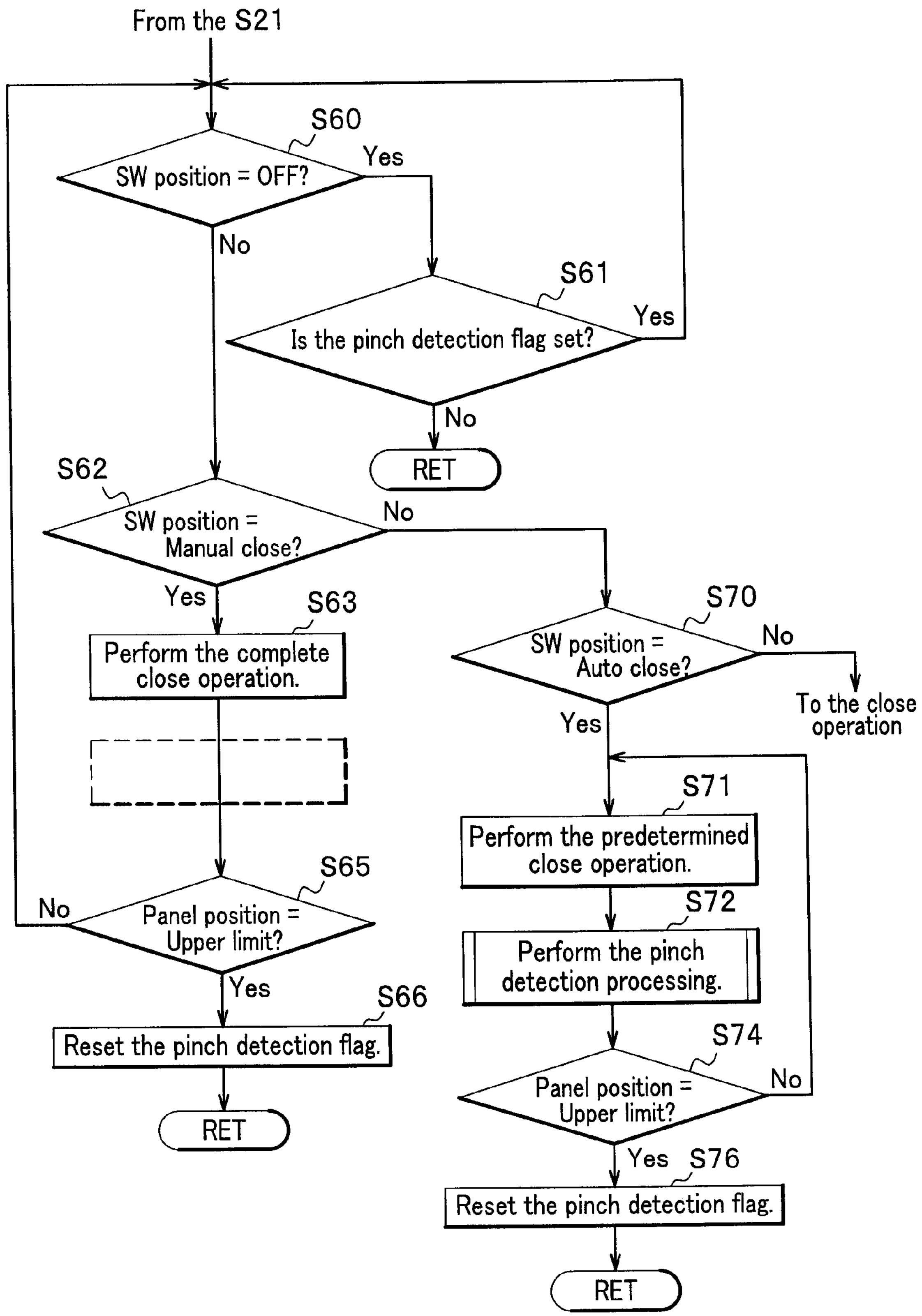
FIG. 8 is a flowchart showing a flow of a close direction operation after a pinch detection according to a third embodiment of the present invention.

FIG. 8 is a flowchart showing a flow of a close direction operation after a pinch detection according to a third embodiment of the present invention. The flowchart of FIG. 8 is same as that of FIG. 6 except that the step S64 is deleted and that the "No" branch processing in the determination step S62 is replaced with the steps S70 to S76. Accordingly, only a difference will be described. Firstly, if the switch position is the manual close position ("Yes" branch in the step S62), the PW main control unit 76 definitely performs the manual complete close operation because it does not perform the pinch detection processing.

On the other hand, in the determination step S62, if the switch position is not the manual close operation (in the case of No), the PW main control unit 76 determines in the determination step S70 whether or not the switch position is the manual close operation. If the switch position is not the manual close operation (in a case of No), the PW main control unit 76 performs the open operation. In the determination step S70, if the switch position is the manual close operation (in a case of Yes), the PW main control unit 76 performs a predetermined close operation in the step S71, performs the pinch detection processing in the step S72, and determines in the determination step S74 whether or not the panel position is at the upper limit. If the panel position is not at the upper limit, the processing returns to the step S71 and performs the auto close operation of the pinch detection mode. In the determination step S74, if the panel position is at the upper limit, the PW main control unit 76 resets the pinch detection flag in the step S76, and the processing returns to the main routine.

Figure 9:
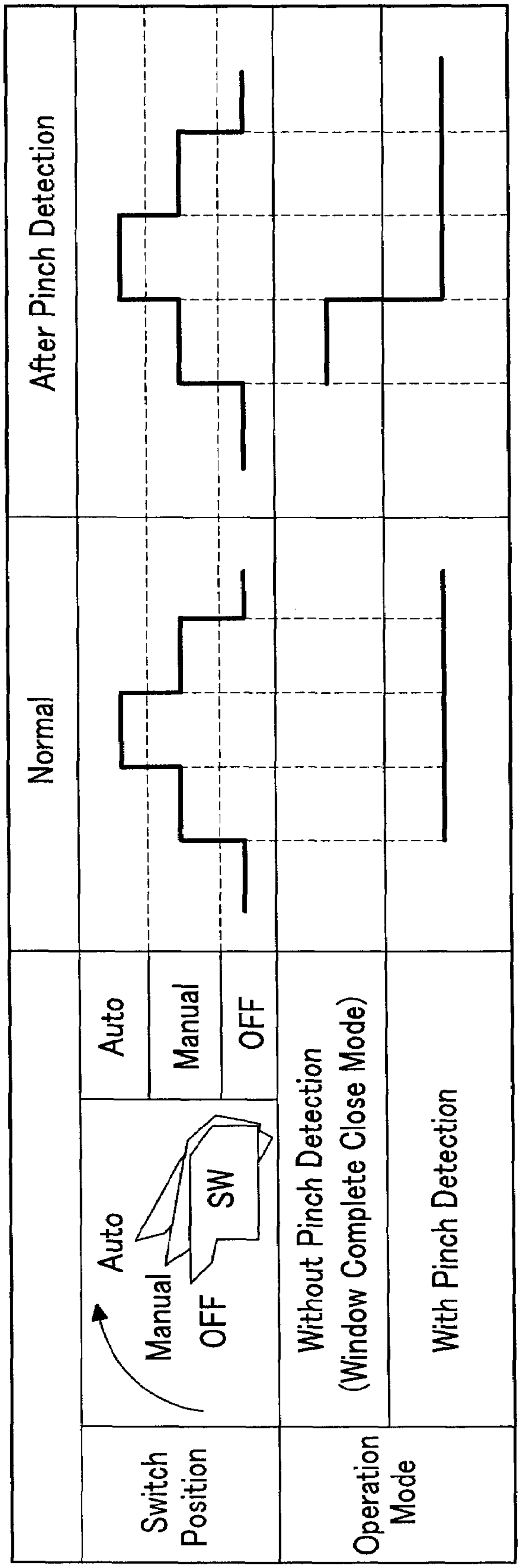
FIG. 9 is a diagram illustrating the close direction operation after the pinch detection according to the third embodiment.

FIG. 9 is a diagram illustrating the close direction operation after the pinch detection according to the third embodiment. In accordance with the third embodiment, in a case of a pinch detection processing being performed, a manual close operation is performed with the complete close mode, and the pinch detection is performed in the auto close operation.

Furthermore, in accordance with the third embodiment, in nothing but the manual close operation in a case of the switch position being changed from OFF to the manual close position is set such a complete close mode that the pinch detection is not performed.

The above is intended to only enumerate examples of the embodiments in order to describe the present invention. Accordingly, along any of the technical spirit and principle of the present invention, it would be easy for those skilled in the art to perform various any of changes, modifications, and additions for the embodiments.

For example, although in the embodiments the PW control units 76 and 76*a* perform the pinch detection (in the step S20 of FIG. 4B), it is also available to separately provide hardware for the pinch detection and to give an interruption signal to the CPU of the portions 76 and 76*a* from the hardware. In this case the program for performing the pinch detection processing of FIG. 4B becomes an interruption processing subroutine, and the step S20 can be omitted. Furthermore, the steps S9, S15, S64, and S72 can also be omitted.

What is claimed is:

1. A vehicular open and close panel system comprising:

a drive means configured to supply power for sliding, and opening and closing a panel to open and close an opening of a vehicle body;

a drive mechanism configured to operate the panel by the power from the drive means;

a controller configured to control an operation of the panel; and the controller including:

a pinch detection mode of making the panel perform a pinch elimination operation upon detecting a pinch in a close direction operation;

a complete close mode of prioritizing a close direction operation, depending on a complete close operation of a passenger; and the controller changing the close direction operation to the complete close mode until a predetermined condition is satisfied after performing the pinch detection operation by the pinch detection mode.

2. The vehicular open and close panel system according to claim 1, wherein the controller performs a pinch detection operation by the pinch detection mode, changes the close direction operation to the complete close mode until completely closing the panel, and after completely closing the panel, again changes the complete close mode to the pinch detection mode.

3. The vehicular open and close panel system according to claim 1, wherein the controller performs a pinch detection operation by the pinch detection mode, changes the close direction operation to the complete close mode until a predetermined time elapses, and after the predetermined time elapsing, again changes the complete close mode to the pinch detection mode.

4. The vehicular open and close panel system according to claim 1, wherein the controller performs a pinch detection operation by the pinch detection mode, changes the close direction operation to the complete close mode until an ignition switch of a vehicle is made OFF, and after the ignition switch of the vehicle being made OFF, again changes the complete close mode to the pinch detection mode.

* * * * *